May 29, 1962 P. A. BADGER 3,036,510
AERATORS
Filed April 27, 1959 3 Sheets-Sheet 1

INVENTOR
Percy A. Badger

BY
ATTORNEY

May 29, 1962 P. A. BADGER 3,036,510
AERATORS
Filed April 27, 1959 3 Sheets-Sheet 2
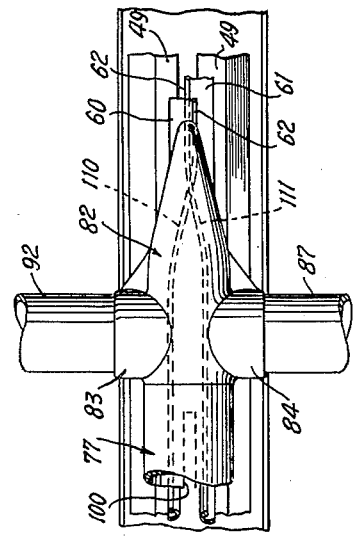
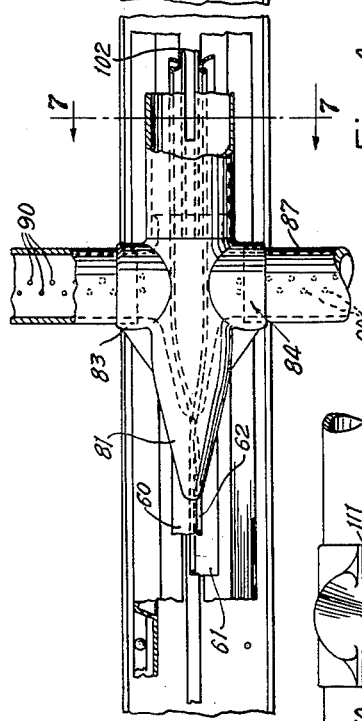
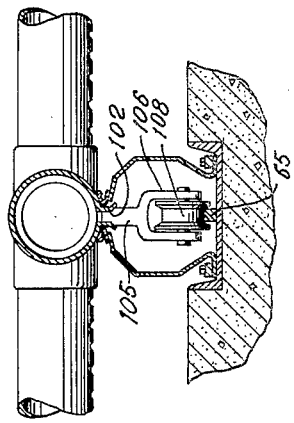
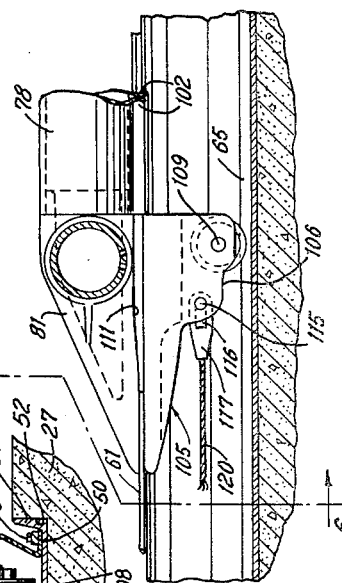
INVENTOR
Percy A. Badger
BY
ATTORNEY INVENTOR
Percy A. Badger

… … … … … … … … … … … … … … … … … … … … … … …

3,036,510
Patented May 29, 1962

3,036,510
AERATORS
Percy A. Badger, 8657 Redondo Drive, Dallas, Tex.
Filed Apr. 27, 1959, Ser. No. 809,155
8 Claims. (Cl. 98—54)

This invention relates to aerators and more particularly to an aerator for aerating granular materials in bulk storage.

An object of this invention is to provide a new and improved aerator for aerating granular materials, such as grain, which are in bulk storage.

Another object of the invention is to provide an aerator for granular materials which aerates all of the granular materials at an infinite number of points throughout the storage area.

Still another object of the invention is to provide an aerator for aerating granular materials which prevents the formation of "channels" or chimneys through the granular material which allow a great quantity of the gases emitted from the aerator to pass through the granular material at a limited number of points without aerating other portions of the granular material.

A further object of the invention is to provide an aerator having an aerator carrier which is movable over the area in which the granular material is stored and through the granular material whereby the gas emitted or blown from the aerator carrier will aerate all portions of the grain stored over the area and prevent formations of the channels.

A still further object of the invention is to provide an aerator for granular materials which includes gas ducts crossing the area to which air or other gas is pumped and an aerator carrier movable parallel to the ducts and in communication therewith whereby the air from the ducts is conducted to the carrier to be emitted thereby into the granular material as it moves across the storage area.

Another object of the invention is to provide an aerator which includes a duct extending across the storage area in which granular material is stored and an aerator carrier movable parallel to the duct and connected to the duct to receive air from the duct and emit it over the storage area and through the granular material as the carrier is moved across the storage area.

Still another object of the invention is to provide an aerator including a duct extending across the length of a storage area into which air or other gas may be pumped and a carrier movable across the length of the storage area and connected to the duct to receive air therefrom as it moves along the length of the storage area whereby the granular material stored in the area is aerated by the air or gas from the duct which is emitted by the aerator carrier as it travels along the length of the storage area.

A further object of the invention is to provide an aerator carrier which is movable relative to a duct which is provided with a longitudinal slot sealed by suitable seal means which parts as the carrier moves along the duct to permit air to flow from the duct into the carrier.

A still further object of the invention is to provide an aerator for granular material which includes means for blowing gas or air through the duct and means for causing the carrier to travel along the duct.

Another object of the invention is to provide an aerator for aerating granular materials stored in a storage area which includes a carriage mounted above the storage area and movable thereacross which is provided with an aerator carrier for emitting air adjacent the surface of the storage area whereby the granular materials stored on the surface will be aerated as the aerator is moved thereacross.

Still another object of the invention is to provide a means for blowing air or other gas into the aerator as it moves across the storage area.

A further object of the invention is to provide means on the carriage for blowing air or other gas to the aerator and also for causing the carriage to move across the storage area.

A still further object of the invention is to provide a pair of parallel rails spaced above the storage area on which a carriage is movable which is provided with an aerator or pipe therebelow through which air or other gas may be emitted to aerate the granular material as the carriage moves on the rails across the storage area.

Additional objects and advantages of the invention will be readily apparent from the reading of the following description of a device constructed in acordance with the invention, and reference to the accompanying drawings thereof, wherein:

FIGURE 4 is an enlarged fragmentary view, with some parts broken away, of the aerator carrier of the aerator illustrated in FIGURES 1, 2 and 3;

FIGURE 5 is a fragmentary partly sectional side view of an end portion of the aerator carrier;

FIGURE 6 is a sectional view taken on line 6—6 of FIGURE 5;

FIGURE 7 is a sectional view taken on line 7—7 of FIGURE 4;

Figure 1:
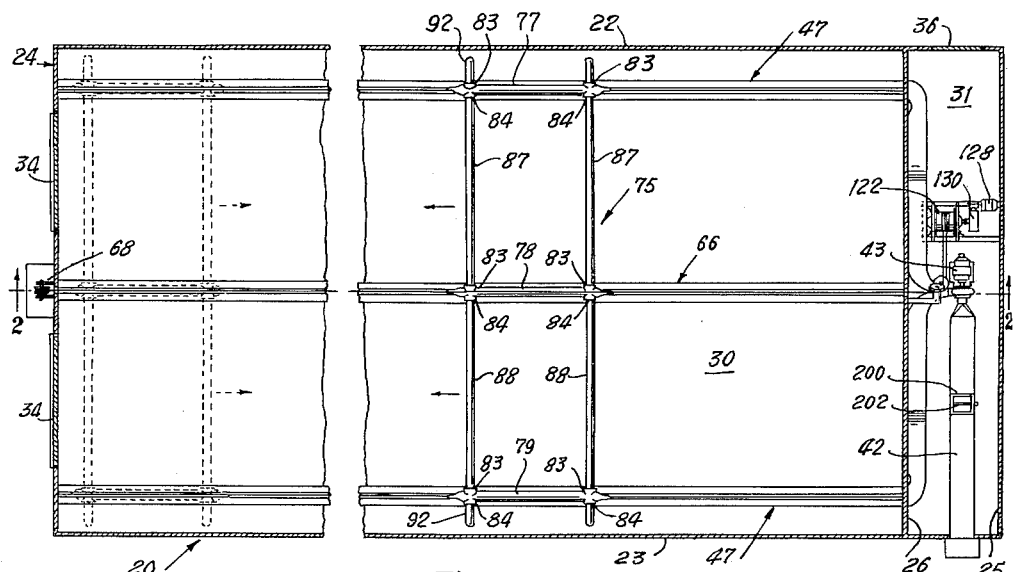
FIGURE 1 is a horizontal sectional view of a storage building provided with the aerator embodying the invention.
Figure 2:
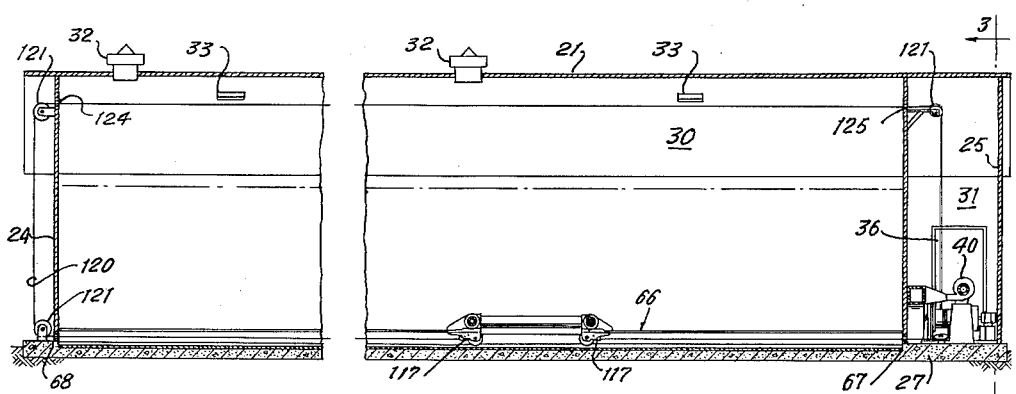
FIGURE 2 is a vertical sectional view taken on line 2—2 of FIGURE 1.
Figure 3:
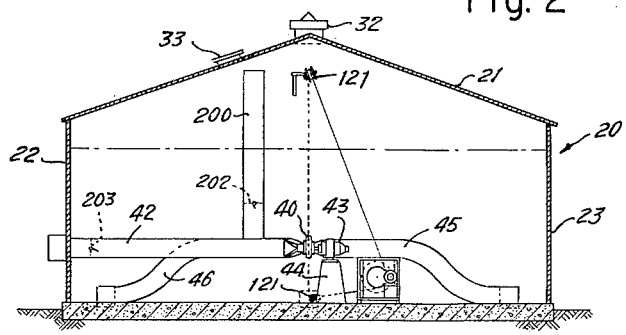
FIGURE 3 is a vertical sectional view taken on line 3—3 of FIGURE 2.

Referring now particularly to FIGURES 1 through 7 of the drawing, a storage building 20 having a roof 21, sidewalls 22 and 23, end walls 24 and 25 and a transverse vertical partition 26 is shown mounted on a concrete base 27. The transverse partition wall 26 forms a storage compartment 30 and a machinery compartment 31. The base or floor 27 underlying the storage compartment 30 defines the storage area on which granular materials such as grain may be stored.

The storage building is provided with a plurality of ventilators 32 and loading hatches 33 in its roof 21 and with one or more end doors 34 through which the granular material may be removed from the storage area. The machinery compartment 31 is also provided with an access door 36.

A blower 40 having an intake duct 42 which extends exteriorly of the storage building is disposed in the machinery compartment 31 and is driven by a motor 43 mounted on a platform 44. The output of the blower 40 is conducted via conduits 45 and 46 to a pair of side track ducts 47, which extend the length of the storage compartment 30 and through the transverse wall 26 to the conduits 45 and 46.

The track ducts 47 are formed of two longitudinal sections 49 which are provided with outwardly extending lower flanges 50 which are secured to a channel 51 disposed in a longitudinal trough 52 of the base 27. The laterally outwardly extending flanges 50 of the track duct sections 49 are secured to the channel by means of nuts 54 which are threaded on upstanding threaded studs 56 of the channel 51 which extend through suitable apertures in hold down bars 57 which extend the length of the flanges 50 and abut the upper sides thereof. A suitable sealing compound may be interposed between the flanges 50 and the channel 51 in order to prevent leakage of air therebetween.

The upper edges of the track duct sections 49 are spaced to provide a longitudinal opening therebetween which is normally closed by a pair of flap seals 60 and 61, the upper flap seal 60 overlapping the flap seal 61. The flap seals are provided with longitudinal beads 62 whereby the engagement of the beads serves to provide an effective air seal when the flap 60 is superposed or extends above and abuts the lower flap seal 61. The flap seals 60 and 61 of course are resilient and have their outer portions abutting and secured and bonded to the abutted track duct sections 49. The flap seal also prevents passage of the granular material into the track ducts.

It will be apparent that the side track ducts 47 form longitudinal flow passages for air or other gases which may be pumped by the blower 40 into the ends thereof through the conduits 45 and 46. The opposite ends of the ducts are closed by any suitable means so that the only egress for the air from the duct 47 is past the flap seals 60 and 61 when they are parted.

Tracks 65 are mounted on the channel 51 in the track ducts 47 and extend longitudinally therethrough. An intermediate track duct 66, which is identical in all respects with the track ducts 47 also extends through the storage compartment 30 but the end thereof which abuts the transverse partition wall 26 is not connected to the blower but merely is aligned with a cable aperture 67 in the partition wall 26. The opposite end of the intermediate duct 66 is similarly aligned with another cable aperture 68 in the wall 24 of the storage building.

A carrier 75 is mounted on the tracks 65 of the two side ducts 47 and the intermediate duct 66 for longitudinal movement of the length of the storage compartment 30. The carrier comprises three longitudinal tubular bodies 77, 78 and 79 which are provided at each end with noses 81 and 82 welded or otherwise secured to the carrier bodies. The noses are provided with lateral tubular extensions 83 and 84 for receiving aerator pipes. The aerator pipes 87 are telescoped in the tubular extensions 84 and 83 of the noses of the bodies 77 and 78, respectively, while the aerator pipes 88 are telescoped in the tubular extensions 84 and 83 of the noses of the carrier bodies 78 and 79, respectively, whereby the carrier 75 forms a rigid rectangle. The aerator pipes 87 and 88 are provided in their lower surfaces with a plurality of longitudinally spaced apertures or aerator holes 90 through which air may flow out of the carrier.

In order to provide aeration of the granular material which is disposed laterally outwardly of the side track ducts 47, the noses of the carrier bodies 77 and 79 are provided with laterally extending aerator pipe extensions 92 which are telescoped in the tubular extensions 83 and 84 of the noses of the carrier bodies 77 and 79, respectively. The aerator pipe extensions 92 have closed outer ends and are also provided with aerator apertures 90 in their lower surfaces.

The carrier bodies 77 and 79 are provided with longitudinal downwardly opening slots 100 intermediate the ends thereof and with laterally spaced flanges 102 which are adapted to extend downwardly between the adjacent upper ends of the track duct sections 47. The longitudinal flanges 102 have their lower edges flared laterally outwardly in order to provide guide surfaces for the flap seals 60 and 61.

Each of the noses of the bodies 77, 78 and 79 is provided with a dependent bifurcated bracket 105 between whose side flanges 106 are disposed the flanged wheels 108 which ride on the tracks 65. The flange wheels 108 are rotatably mounted on the bracket 105 by means of suitable shafts 109 which extend through laterally aligned apertures in the side flanges 106 and through the wheel.

Each of the noses is provided with side grooves 110 and 111 on opposite sides thereof which receive the beaded free ends of the flap seals 60 and 61, respectively. The side grooves 110 and 111 curve downwardly toward the ends of the noses and the forward portion of the groove 111 underlies and communicates with the forward portion of the groove 110, whereby the beads 62 of the flap seals 60 and 61 are received in the grooves 110 and 111 and then are displaced upwardly and laterally outwardly on either side of the longitudinal flanges 102 of the bodies as the nose advances as the carrier 75 moves in one longitudinal direction on the track ducts. When the direction of movement of the carrier 75 is reversed, the grooves 110 and 111 guide the movement of the flap seals inwardly and downwardly so that the flap seals 60 again overlie the flap seal 61 in sealing relationship.

The noses 81 and 82 of the intermediate body 78 of the carrier are provided with a transverse pin 115 which extends through suitable aligned apertures in the side flanges 106 of the bracket 105 and through a longitudinal slot 116 of the cable fitting 117 whereby the carrier may be connected to the cable 120. The cable moves the carrier longitudinally the length of the storage compartment 30.

The cable 120 has its opposite ends secured to the fittings 117 which are connected as described above to the noses of the intermediate body 78 and extends longitudinally through the intermediate ducts 66, through the cable apertures 67 and 68 in the partition wall 26 and the end wall 24 and about direction changing pulleys 121 to a winch 122 around which the cable is wound several times. The direction changing pulleys are mounted to the structure of the storage building in any suitable way, as by the means of the illustrated brackets, so that the cable will extend longitudinally through the intermediate track duct 66, upwardly outside of the wall 24 to a position adjacent the roof 21, then through the cable apertures 124 and 125 of the end wall 24 and of the partition wall 26 to the machine compartment 31 and thence to the winch. The winch is rotated by a suitable motor 128 which drives the winch drum through a suitable speed reducing transmission 130.

It will be apparent that when the winch is rotated in one direction the cable will move the carrier 75 in one longitudinal direction on the tracks 65 and that when the direction of rotation of the winch drum 122 is reversed, the carrier will be moved in the opposite direction. If desired, suitable limit switches (not shown) may be mounted at suitable locations which by controlling the direction of rotation of the motor 128, will stop the movement of the carrier 75 toward the end wall 24 when the carrier moves to a position immediately adjacent the end wall 24 and will then cause it to move in the opposite direction toward the partition wall 26. Such limit switches would of course reverse the direction of rotation of the motor 128 to cause the carrier 75 to again stop and change its direction of movement toward the end wall 24 when the carrier 75 had been moved to a position immediately adjacent the partition wall 26.

It will now be apparent that if it is desired to aerate granular material, such as sorghum, corn or other grain, which is stored in the storage compartment 30 of the storage building 20, the blower motor 43 is energized to cause the blower 40 to operate and pull air from the outside of the building through its inlet duct 42 and expel it through its outlet conduits 45 and 46 to the side track ducts 47 and thence upwardly between the flanges 102 of the carrier bodies 77 and 79 through the longitudinal slots 100 in the underside thereof into the carrier bodies 77 and 79. Opposite ends of the bodies 77 and 79 of course communicate through the hollow nose cones with the aerator pipes 87 and 88 and the extension aerator pipes 92 so that the air blown into the track ducts 47 will flow outwardly through the aerating apertures 90 in the aerator pipes. It will be understood that the seal flaps 60 and 61 prevent outward flow or any escape of air from the track ducts 47 except through the longitudinal slots 100 of the carrier bodies 77 and 79. The air which thus flows outwardly through the aerator apertures 90 of the aerator pipes flows upwardly through the granular material and aerates it and also, of course, may serve to cool the granular material.

In order to aerate the whole body of the granular material in the storage compartment 30, the winch motor 128 is energized which causes the cable 120 to draw the carrier 75 longitudinally through the storage compartment at any predetermined desired speed. As the carrier 75 moves from one end of the building to the other, and then has its direction of movement reversed to retrace its movement, the air expelled through the aerator apertures 90 of the aerator pipes aerates the full body of the granular material and, since the carrier is moving continuously, the escaping air cannot form channels, chimneys or vertical flow passages through which the majority of the air might otherwise escape without cooling other portions of the granular material. In the event that any such channels tend to form, the movement of the carrier disrupts or breaks them up so that the aeration is carried out uniformly throughout the whole body of the granular material.

It will be apparent that the intermediate body 78 is not provided with a downwardly opening longitudinal slot 100 since it is not connected to the blower and since it is not desired that any air blown into the track ducts 47 be allowed to escape through the cable apertures 67 or 68 in the compartment wall and in the end wall respectively. If desired, the intake duct 42 of the blower 40 may be connected to a source of suitable gas, chemical or spray if it is desired to treat the granular matter with such chemical. Such chemicals may have insecticidal or preservative qualities for the granular material.

It will now be apparent that a new and improved aerator for aerating granular material which is stored in a storage area, such as the storage building 20, has been illustrated and described, which includes an aerating carrier 75 which is moved across the storage area through and beneath the stored granular material and that the carrier is supplied with air or other gas which it emits during its movement through the granular material.

It will further be seen that the emitted gas permeates or flows upwardly through the granular material to aerate it or treat it, as the case may be.

It will further be seen that the gas is caused to flow through the granular material at an infinite number of points during the movement of the carrier so that the full body of the granular material is exposed to the gas ejected from the carrier.

It will further be seen that the carrier is mounted on rails disposed within track ducts which are provided with sealing flaps 60 and 61 which prevent flow of the granular material into the track duct.

It will further be seen that one or more of the track ducts are connected to a source of gas and that the carrier is provided with means communicating with such track duct whereby the gas may flow from the track duct and into the carrier for ejection through the aerating pipes while the carriage moves longitudinally on the tracks.

It will further be apparent that a means for moving the carrier longitudinally through the storage area in either direction has been provided which includes a cable and winch drum assembly.

It will further be seen that the new and improved device for treating or aerating the granular material causes the whole body of the granular material to be treated by air or other gas which is pumped or blown into at least one of the track ducts and thus to the carrier 75.

Figure 8:
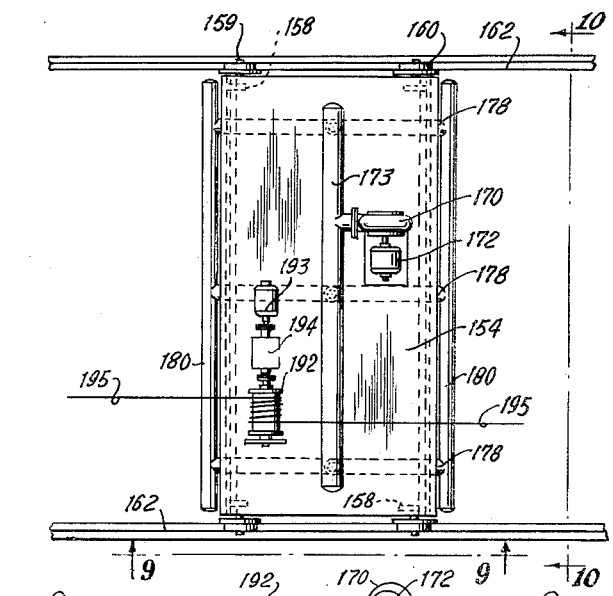
FIGURE 8 is a top view of a modified form of the aerator.
Figure 9:
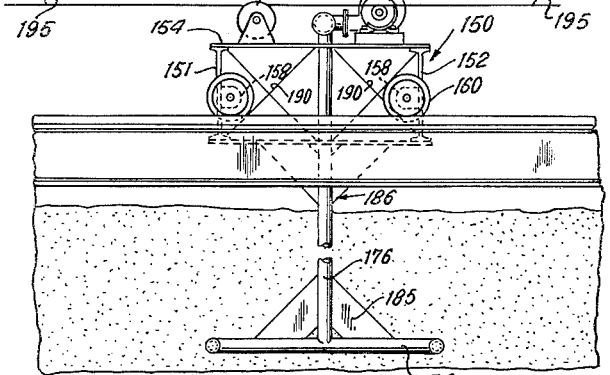
FIGURE 9 is a vertical sectional view taken on line 9—9 of FIGURE 8.
Figure 10:
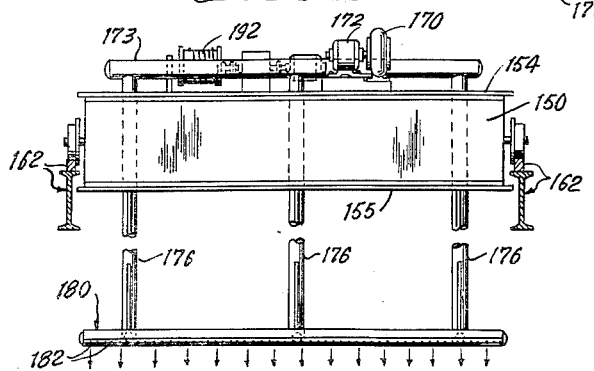
FIGURE 10 is a vertical sectional view taken on line 10—10 of FIGURE 8.

In FIGURES 8, 9 and 10 is illustrated a modified form of the aerator which has an aerator carriage 150. The aerator carriage has a rectangular frame formed of a pair of transverse I-beams 151 and 152 on which an upper decking or platform 154 is secured by any suitable means, such as welding. A similar platform 155 is secured in a similar way to the bottom ends of the transverse I beams. It will thus be apparent that the I beams and the platforms 154 and 155 form a strong rectangular rigid carriage.

The I beams are provided with suitable bearing brackets 158 in which are journaled the shafts 159 on which the flange wheels 160 are rotatably disposed. The flange wheels 160 ride upon tracks 162 which extend longitudinally over a granular material storage area. The tracks 162 of course may be supported by the end walls of a storage building or by any other suitable supporting structure.

The carriage is provided with a blower 170 which is driven by a suitable prime mover, such as an electric motor 172, which is mounted on the upper decking 154 of the carriage. The outlet of the blower is connected to a transverse conduit 173 which is provided with three laterally spaced dependent conduits 176 which extend downwardly through suitable aligned apertures in the platform 154 and 155 and terminate adjacent the floor area in which the granular material is stored. Longitudinally extending conduits 178 are connected intermediate their ends with the lower ends of the dependent conduits 176 at their outer ends which are connected to tranverse aerator pipes 180 whose under sides are provided with aerator apertures or nozzles 182.

Gussets 185 are provided between the dependent conduits 176 and the longitudinal conduits 178 to reinforce and hold rigid the aerator pipes 18. Similar gussets 186 extend between the dependent conduits 176 and the lower platform or deck 155 of the carriage to further reinforce and hold steady the aerator pipes as the carriage moves along the tracks. The carriage itself may be provided with reinforcing or bracing tie rods 190 to further rigidify the carriage.

The carriage is caused to move longitudinally on the tracks 162 by means of a winch 192 which is rotated by a prime mover 193, such as an electric motor, through a speed reducing transmission 194. The winch is provided with a cable 195 whose opposite ends are connected to walls 24 and 26 at opposite ends of the building structure and which has several intermediate loops or turns about the winch for traction whereby rotation of the winch in one direction will cause the cable 195 to be wound on the drum in such a manner that one end of the cable is wound onto the winch drum and the other end is simultaneously wound off the drum, and rotation of the winch in the opposite direction causes the reverse winding of the cable whereby the carriage may be moved in either direction along the length of the storage area over which the tracks 162 extend by rotating the drum in one direction or the other.

It will be apparent that the aerator illustrated in FIGURES 8, 9 and 10 functions in a similar manner as the aerator illustrated in FIGURES 1–7 to aerate the whole body of the granular material since the air blown by the blower 170 will flow outwardly through the nozzle pipes 180 and then upwardly through the granular material as the carriage is moved above the storage area whereby the nozzle pipes are caused to move through the body of granular materials and above the supporting surface thereof.

The inlet of the blower 75 may be connected to the exterior of a building which may cover the storage area by means of a flexible hose or conduit so that fresh air may be circulated through the granular material. If desired, a duct such as the duct 66 of FIGURE 1 may be secured to such building adjacent the roof thereof with at least one end open to the exterior of the building and the inlet conduit (not shown) of the blower may be provided with a tubular body such as the tubular body 77 of FIGURE 4 so the air may be drawn in to the inlet conduit of the blower from such duct as the carriage moves along the tracks.

In the event that the granular material is to be treated with a gas or with air having a fumigant or insecticide, it is desirable to recirculate such gas or air to conserve the active agents. For this purpose a recirculating branch duct 200 may be provided which opens to the interior of the building adjacent the roof 21 at one end and which is connected to the inlet duct 42 at its other end. The branch duct and the inlet duct may be provided with valve or dampers 202 and 203, respectively, for closing either of these ducts as may be desired.

It will be apparent that when it is desired to recirculate gas through the granular material, the damper 202 is opened and the damper 203 is closed and that when it is desired to circulate fresh air through the granular material, the damper 202 is closed and the damper 203 is opened.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. An aerator for granular materials stored in a body on a floor of a storage area comprising: a plurality of parallel laterally spaced hollow track ducts adjacent the floor and extending the length of the storage area; a track mounted in the bottom of each of said ducts, said track ducts having longitudinally extending upper slots, seal means for closing said longitudinal slots; a carrier mounted for movement on said tracks for horizontal movement adjacent the floor, said carrier comprising a plurality of aerator pipes extending transversely of the storage area and having means extending through said longitudinal slots of said track ducts and past said seal means and communicating with the interior of the track ducts, said aerator pipes having a plurality of space outlet apertures, means for supplying gas under pressure to said track ducts, said means extending through said longitudinal slots having means disposed in said track ducts and engaging with said tracks for movably supporting said carrier on said tracks, said seal means closing about said means extending through said longitudinal slots to prevent escape of air other than through said carrier and to prevent passing of granular material into the track ducts; and means for moving said carrier along said tracks whereby the carried moves across the full storage area to aerate the granular material stored therein.

2. An aerator for granular materials stored in a body on a floor of a storage area comprising: a pair of parallel laterally spaced track ducts mounted on said floor and extending the length of the storage area, said track ducts being hollow; a track mounted in the bottom of each duct; a carrier, said carrier comprising a plurality of aerator pipes extending transversely of the storage area, each of said aerator pipes being provided with a plurality of spaced apertures communicating with the interiors thereof, said track ducts having longitudinally extending upper slots; and flap seal means closing said longitudinal slots, said carrier having means opening into the track ducts and extending between said flap means for providing communication between said track ducts and said aerator pipes, said flap means closing about opposite ends of said last mentioned means to prevent escape of air other than through said carrier and to prevent passage of granular material into the track ducts, said carrier having wheels disposed in said track ducts and mounted on said means extending between said flap means and engaging said tracks for movably supporting said carriage on said tracks; means for supplying gas under pressure to said track ducts; and means for moving said carrier horizontally along said tracks whereby the carrier moves across the full storage area to aerate the granular material stored therein.

3. An aerator for granular materials stored in a body on a floor of a storage area comprising: a pair of parallel laterally spaced hollow track ducts disposed on said floor and extending horizontally the length of the storage area; tracks mounted in the bottom of said track ducts; a carriage mounted for movement on said tracks, said carriage comprising a plurality of aerator pipes having a plurality of spaced outlet openings, said aerator pipes extending transversely of the storage area, said track ducts having longitudinally extending upper slots; and flap seal means closing said longitudinal slots, said carriage having means opening into said track ducts and extending between said flap means providing fluid flow communication between the interiors of the track ducts and said aerator pipes, said flap means closing about said last mentioned means to prevent escape of gas other than through said outlet opening of said aerator pipes of said carriage and to prevent passage of granular material into the track ducts; wheels disposed in said track ducts rotatably mounted on said means extending between said flap means and engaging with said tracks for supporting said carriage on said tracks; means for supplying gas under pressure to said track ducts; and means for moving said carriage along said tracks whereby the carriage moves across the full storage area to aerate the granular material stored therein.

4. An aerator for granular materials stored on a floor of a body in a storage area comprising: a pair of parallel laterally spaced hollow track ducts extending the length of the storage area; tracks mounted in the bottom of the ducts; a carrier mounted for movement on said tracks, said carrier comprising a plurality of aerator pipes extending transversely of the storage area and having spaced outlet apertures and means communicating with the interior of the track ducts whereby gas may flow from the interior of the track ducts to the aerator pipes and outwardly through said outlet apertures thereof; means for supplying gas under pressure to said track ducts; means for moving said carrier along said tracks whereby the carrier moves across the full storage area to aerate the granular material stored therein, said carrier having wheels disposed in said track ducts and engaging said tracks whereby said carrier is supported on said tracks; and cable means connected to said carrier and extending through said track ducts for moving said carrier along said tracks.

5. An aerator for granular materials stored in a body on a floor above a storage area comprising: a pair of parallel laterally spaced hollow track ducts extending the length of the storage area adjacent the floor thereof; tracks in the bottom of said track ducts; a carrier mounted for horizontal movement on said tracks, said carrier comprising a plurality of aerator pipes having outlet apertures extending transversely of the storage area, said track ducts having longitudinally extending upper slots; flap seal means closing said longitudinal slots, said carrier having means extending between said flap means providing communication between the interiors of said track ducts and said aerator pipes whereby gas may flow from said track ducts to said aerator pipes for discharge through the said outlet apertures, said flap means closing about said last mentioned means to prevent escape of air other than through said carrier and to prevent passage of granular material into the track ducts; means for supplying gas under pressure to said track ducts; means for moving said carrier along said tracks whereby the carrier moves horizontally across the full storage area to aerate the granular material stored therein, said carrier having wheels within said ducts and engaging said tracks whereby said carrier is supported by said tracks; and cable means connected to said carrier for moving said carrier along said tracks.

6. In combination: a closed storage area having a supporting floor; a gas emitting device movable horizontally in said storage area adjacent the floor and through granular material disposed in said closed storage area; and means for supplying gas under pressure to said emitting device during movement of the emitting device, said last mentioned means including means selectively recirculating gas from the top of said closed area of the gas emitting device and moving gas from without the closed storage area to said gas emitting device.

7. An aerator for granular materials stored in a storage area having a pair of parallel longitudinal horizontal tracks disposed above said area comprising: a carriage movable horizontally on said tracks; transverse nozzle pipes secured to said carriage and disposed therebelow adjacent to and above the supporting surface of the storage area; means for directing gases to said nozzle pipes; and means for moving said carriage along said tracks.

8. An aerator for granular materials stored in a storage area having a pair of parallel longitudinal horizontal tracks disposed above said area comprising: a carriage movable horizontally on said tracks; transverse nozzle pipes secured to said carriage and disposed therebelow and above the supporting surface of the storage area; means for directing gases to said nozzle pipes, said means for directing gases comprising a blower and a prime mover for energizing the blower, said blower and said prime mover being mounted on said carriage.

References Cited in the file of this patent

UNITED STATES PATENTS

| | | |
|---|---|---|
| 139,528 | Anderson | June 3, 1873 |
| 649,351 | Prinz | May 8, 1900 |
| 1,614,253 | Neilsen | Jan. 11, 1927 |
| 2,143,311 | Geertz | Jan. 10, 1939 |
| 2,693,749 | Houdek | Nov. 9, 1954 |

FOREIGN PATENTS

| | | |
|---|---|---|
| 19,838 | Great Britain | Oct. 2, 1905 |
| 730,384 | Germany | Jan. 11, 1943 |
| 501,903 | Belgium | Mar. 31, 1951 |